(12) United States Patent
Hassan et al.

(10) Patent No.: US 12,072,699 B2
(45) Date of Patent: Aug. 27, 2024

(54) DEVICES AND METHODS FOR MICROCONTROLLER PORT CONTROL

(71) Applicant: Infineon Technologies AG, Neubiberg (DE)

(72) Inventors: Muhammad Hassan, Munich (DE); Haram Kim, Gangseo-gu (KR); Taehoon Lee, Holzkirchen (DE)

(73) Assignee: Infineon Technologies AG, Neubiberg (DE)

( * ) Notice: Subject to any disclaimer, the term of this patent is extended or adjusted under 35 U.S.C. 154(b) by 402 days.

(21) Appl. No.: 17/475,361

(22) Filed: Sep. 15, 2021

(65) Prior Publication Data

US 2023/0079901 A1 Mar. 16, 2023

(51) Int. Cl.
*G05B 9/02* (2006.01)
*G05B 15/02* (2006.01)
*G05B 19/042* (2006.01)

(52) U.S. Cl.
CPC ............... *G05B 9/02* (2013.01); *G05B 15/02* (2013.01); *G05B 19/0425* (2013.01); *G05B 2219/24003* (2013.01); *G05B 2219/24146* (2013.01)

(58) Field of Classification Search
CPC .. G06F 2201/87; G06F 11/30; G06F 11/0751; G06F 11/004
See application file for complete search history.

(56) References Cited

U.S. PATENT DOCUMENTS

| 2013/0345783 | A1* | 12/2013 | Burdulis | A61B 17/8886 607/117 |
| 2017/0022922 | A1* | 1/2017 | Haag | F02D 41/26 |
| 2018/0233026 | A1* | 8/2018 | Litovtchenko | G08B 29/04 |

\* cited by examiner

*Primary Examiner* — Amine Riad
(74) *Attorney, Agent, or Firm* — VIERING, JENTSCHURA & PARTNER MBB (57) ABSTRACT

A microcontroller unit includes at least one core, a plurality of safety fault management units, with each safety fault management unit including circuitry to detect one or more safety faults and to output an alarm signal in response to detection of one or more safety faults. The microcontroller further includes system control units operating in parallel to the at least one core. Each of the plurality of system control units can be coupled to at least one of the safety fault management units and can include hardware circuitry to generate and output a port emergency stop (PES) signal based on the alarm signals obtained from a safety fault management unit. The microcontroller includes port circuitries coupled to ports and to the system control units. The port circuitries can selectively cause a respectively connected port to enter a non-operational electronic state in response to receiving a PES signal.

20 Claims, 9 Drawing Sheets

DEVICES AND METHODS FOR MICROCONTROLLER PORT CONTROL

TECHNICAL FIELD

Various embodiments generally relate to microcontrollers and operation of microcontroller ports.

BACKGROUND

Currently, to reduce cost and enhance system efficiency, integrating multiple systems in one computing unit or microcontroller unit, such as an electronic control unit (ECU) is utilized. Microcontrollers or ECUs can have the ability to in an emergency shut down its ports. An emergency shutdown of ports, also known as a port emergency stop (PES) can implemented in response to determination of unsafe conditions. When the PES is implemented, this causes the shutdown of all ports.

BRIEF DESCRIPTION OF THE DRAWINGS

In the drawings, like reference characters generally refer to the same parts throughout the different views. The drawings are not necessarily to scale; emphasis instead generally being placed upon illustrating the principles of the invention. In the following description, various embodiments of the invention are described with reference to the following drawings, in which.

DESCRIPTION

The following detailed description refers to the accompanying drawings that show, by way of illustration, specific details and embodiments in which the invention may be practiced.

The word "exemplary" is used herein to mean "serving as an example, instance, or illustration." Any embodiment or design described herein as "exemplary" is not necessarily to be construed as preferred or advantageous over other embodiments or designs.

The words "plurality" and "multiple" in the description or the claims expressly refer to a quantity greater than one. The terms "group (of)", "set [of]", "collection (of)", "series (of)", "sequence (of)", "grouping (of)", etc., and the like in the description or in the claims refer to a quantity equal to or greater than one, i.e., one or more. Any term expressed in the plural form that does not expressly state "plurality" or "multiple" likewise refers to a quantity equal to or greater than one. The terms "proper subset", "reduced subset", and "lesser subset" refer to a subset of a set that is not equal to the set, i.e., a subset of a set that contains fewer elements than the set.

The terms "at least one" and "one or more" may be understood to include a numerical quantity greater than or equal to one (e.g., one, two, three, four, [ . . . ], etc.).

As used herein, unless otherwise specified, the use of the ordinal adjectives "first", "second", "third", etc., to describe a common object merely indicate that different instances of like objects are being referred to, and are not intended to imply that the objects so described must be in a given sequence, either temporally, spatially, in ranking, or in any other manner.

The term "data" as used herein may be understood to include information in any suitable analog or digital form, e.g., provided as a file, a portion of a file, a set of files, a signal or stream, a portion of a signal or stream, a set of signals or streams, and the like. Further, the term "data" may also be used to mean a reference to information, e.g., in the form of a pointer. However, the term data is not limited to the aforementioned examples and may take various forms and represent any information as understood in the art.

The term "processor" or "controller" as, for example, used herein may be understood as any kind of entity that allows handling data, signals, etc. The data, signals, etc., may be handled according to one or more specific functions executed by the processor or controller.

A processor or a controller may thus be or include an analog circuit, digital circuit, mixed-signal circuit, logic circuit, processor, microprocessor, Central Processing Unit (CPU), Neuromorphic Computer Unit (NCU), Graphics Processing Unit (GPU), Digital Signal Processor (DSP), Field Programmable Gate Array (FPGA), integrated circuit, Application Specific Integrated Circuit (ASIC), etc., or any combination thereof. Any other kind of implementation of the respective functions, which will be described below in further detail, may also be understood as a processor, controller, or logic circuit. It is understood that any two (or more) of the processors, controllers, or logic circuits detailed herein may be realized as a single entity with equivalent functionality or the like, and conversely that any single processor, controller, or logic circuit detailed herein may be realized as two (or more) separate entities with equivalent functionality or the like.

A "circuit" as used herein is understood as any kind of logic-implementing entity, which may include special-purpose hardware or a processor executing software. A circuit may thus be an analog circuit, digital circuit, mixed-signal circuit, logic circuit, processor, microprocessor, signal processor, Central Processing Unit ("CPU"), Graphics Processing Unit ("GPU"), Neuromorphic Computer Unit (NCU), Digital Signal Processor ("DSP"), Field Programmable Gate Array ("FPGA"), integrated circuit, Application Specific Integrated Circuit ("ASIC"), etc., or any combination thereof. Any other kind of implementation of the respective functions, which will be described below in further detail, may also be understood as a "circuit." It is understood that any two (or more) of the circuits detailed herein may be realized as a single circuit with substantially equivalent functionality. Conversely, any single circuit detailed herein may be realized as two (or more) separate circuits with substantially equivalent functionality. Additionally, references to a "circuit" may refer to two or more circuits that collectively form a single circuit.

As utilized herein, terms "module", "component," "system," "circuit," "element," "interface," "slice," "circuitry," and the like are intended to refer to a set of one or more electronic components, a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuits can reside within the same circuitry, and circuitry can be localized on one computer and/or distributed between two or more computers. A set of elements or a set of other circuits can be described herein, in which the term "set" can be interpreted as "one or more."

As used herein, a "signal" may be transmitted or conducted through a signal chain in which the signal is processed to change characteristics such as phase, amplitude, frequency, and so on. The signal may be referred to as the same signal even as such characteristics are adapted. In general, so long as a signal continues to encode the same information, the signal may be considered as the same signal.

As used herein, a signal that is "indicative of" a value or other information may be a digital or analog signal that encodes or otherwise communicates the value or other information in a manner that can be decoded by and/or cause a responsive action in a component receiving the signal. The signal may be stored or buffered in a computer-readable storage medium prior to its receipt by the receiving component. The receiving component may retrieve the signal from the storage medium. Further, a "value" that is "indicative of" some quantity, state, or parameter may be physically embodied as a digital signal, an analog signal, or stored bits that encode or otherwise communicate the value.

It will be understood that when an element is referred to as being "connected" or "coupled" to another element, it can be physically connected or coupled to the other element such that current and/or electromagnetic radiation (e.g., a signal) can flow along a conductive path formed by the elements. Intervening conductive, inductive, or capacitive elements may be present between the element and the other element when the elements are described as being coupled or connected to one another. Further, when coupled or connected to one another, one element may be capable of inducing a voltage or current flow or propagation of an electromagnetic wave in the other element without physical contact or intervening components. Further, when a voltage, current, or signal is referred to as being "applied" to an element, the voltage, current, or signal may be conducted to the element by way of a physical connection or by way of capacitive, electromagnetic, or inductive coupling that does not involve a physical connection.

As used herein, "memory" is understood as a non-transitory computer-readable medium where data or information can be stored for retrieval. References to "memory" included herein may thus be understood as referring to volatile or non-volatile memory, including random access memory (RAM), read-only memory (ROM), flash memory, solid-state storage, magnetic tape, hard disk drive, optical drive, etc., or any combination thereof. Furthermore, registers, shift registers, processor registers, data buffers, etc., are also embraced herein by the term memory. A single component referred to as "memory" or "a memory" may be composed of more than one different type of memory and thus may refer to a collective component comprising one or more types of memory. Any single memory component may be separated into multiple collectively equivalent memory components and vice versa. Furthermore, while memory may be depicted as separate from one or more other components (such as in the drawings), memory may also be integrated with other components, such as on a common integrated chip or a controller with an embedded memory.

The term "software" refers to any type of executable instruction, including firmware.

Unless specifically stated otherwise, discussions herein using words such as "processing," "computing," "calculating," "determining," "presenting," "displaying," or the like may refer to actions or processes of a machine (e.g., a computer/processor/etc.) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

Exemplary embodiments of the present disclosure may be realized by one or more computers (or computing devices) reading out and executing computer-executable instructions recorded on a storage medium (e.g., non-transitory computer-readable storage medium) to perform the functions of one or more of the herein-described embodiment(s) of the disclosure. The computer(s) may comprise one or more of a central processing unit (CPU), a microprocessing unit (MPU), or other circuitry, and may include a network of separate computers or separate computer processors. The computer-executable instructions may be provided to the computer, for example, from a network or a non-volatile computer-readable storage medium. The storage medium may include, for example, one or more of a hard disk, a random-access memory (RAM), a read-only memory (ROM), a storage of distributed computing systems, an optical drive (such as a compact disc (CD), digital versatile disc (DVD), or Blu-ray Disc (BD), a flash memory device, a memory card, and the like. By way of illustration, specific details and embodiments in which the invention may be practiced.

As used herein, unless otherwise specified the use of the ordinal adjectives "first", "second", "third" etc., to describe a common object, merely indicate that different instances of like objects are being referred to, and are not intended to imply that the objects so described must be in a given sequence, either temporally, spatially, in ranking, or in any other manner.

The term "semiconductor substrate" or "semiconductor die" is defined to mean any construction comprising semiconductor material, for example, a silicon substrate with or without an epitaxial layer, a silicon-on-insulator substrate containing a buried insulator layer, or a substrate with a silicon germanium layer. The term "integrated circuits" as used herein refers to electronic circuits having multiple individual circuit elements, such as transistors, diodes, resistors, capacitors, inductors, and other active and passive semiconductor devices. A conductive region formed in and/or on the semiconductor substrate or semiconductor die is a portion of conductive routes and has exposed surfaces that may be treated by a planarization process, such as chemical mechanical polishing. Suitable materials for the conductive regions may include, but not limited to, for example copper, aluminum, copper alloy, or other mobile conductive materials. Copper interconnect level may be the first or any subsequent metal interconnect level of the semiconductor device.

Figure 1:
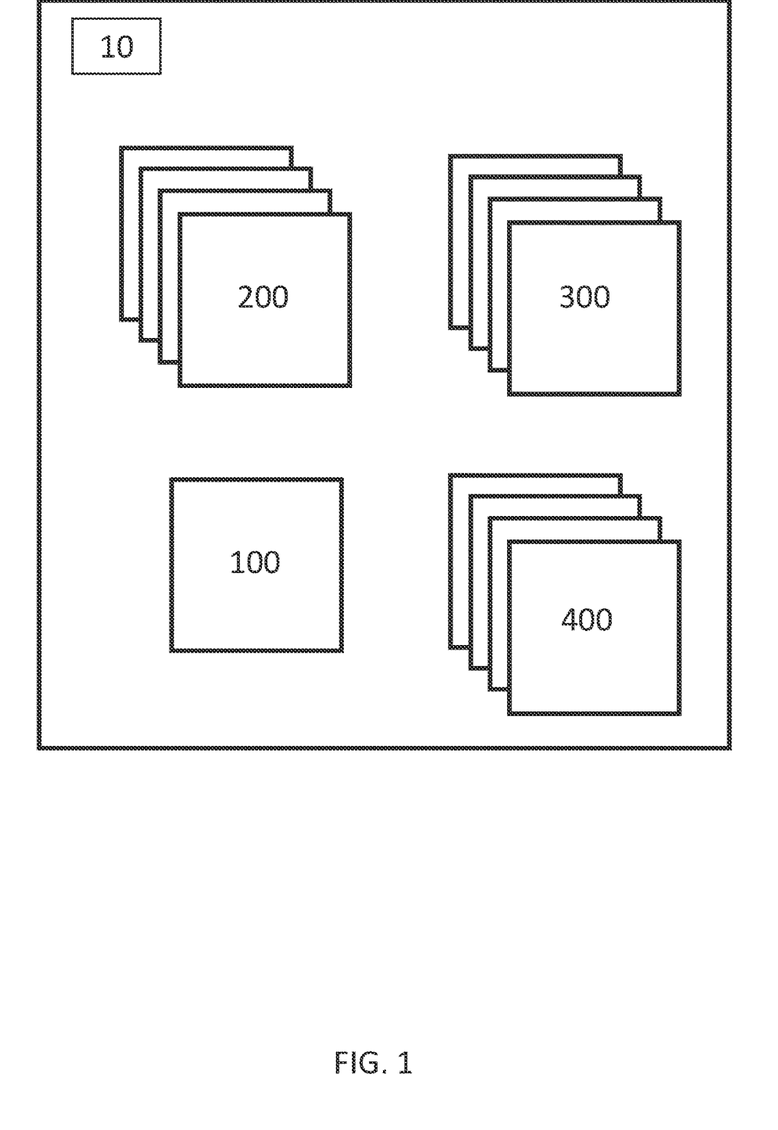
FIG. 1 includes a diagram illustrating an exemplary microcontroller unit according to at least one exemplary embodiment of the present disclosure.

FIG. 1 include a diagram illustrating a microcontroller or microcontroller unit (MCU) 10 according to one or more exemplary embodiments of the present disclosure. The microcontroller 10 includes one or more cores 100, a plurality of safety fault management units 200, a plurality of system control units 300, and a plurality of port circuitries 400. Connections are between the components of the microcontroller 10 may be assumed although are not depicted in FIG. 1.

The one or more cores 100 may be processor or central processing unit (CPU) cores that are can perform one or more operations by executing program instructions or software. Such instructions may be stored or located on a (non-transitory) computer readable storage medium located in the microcontroller 10.

Each of the safety fault management units 200 may include circuitry that determines or detects (safety) faults, events, or conditions in the microcontroller 10 and can output alarms signals based on the detection thereof. For example, the determination or detection by a safety fault management unit 200 can be implemented by gathering or receiving fault or alarm signals from other connected electronic components of the microcontroller 10.

Each of the safety fault management unit 200 can be configured, in response to detecting or determining one or more faults (or events, conditions, etc.) has occurred, to output an alarm signal (AS). In the microcontroller 10, each of the safety fault management units 200 may output an alarm signal to one or more of the plurality of system control units 300.

Figure 3:
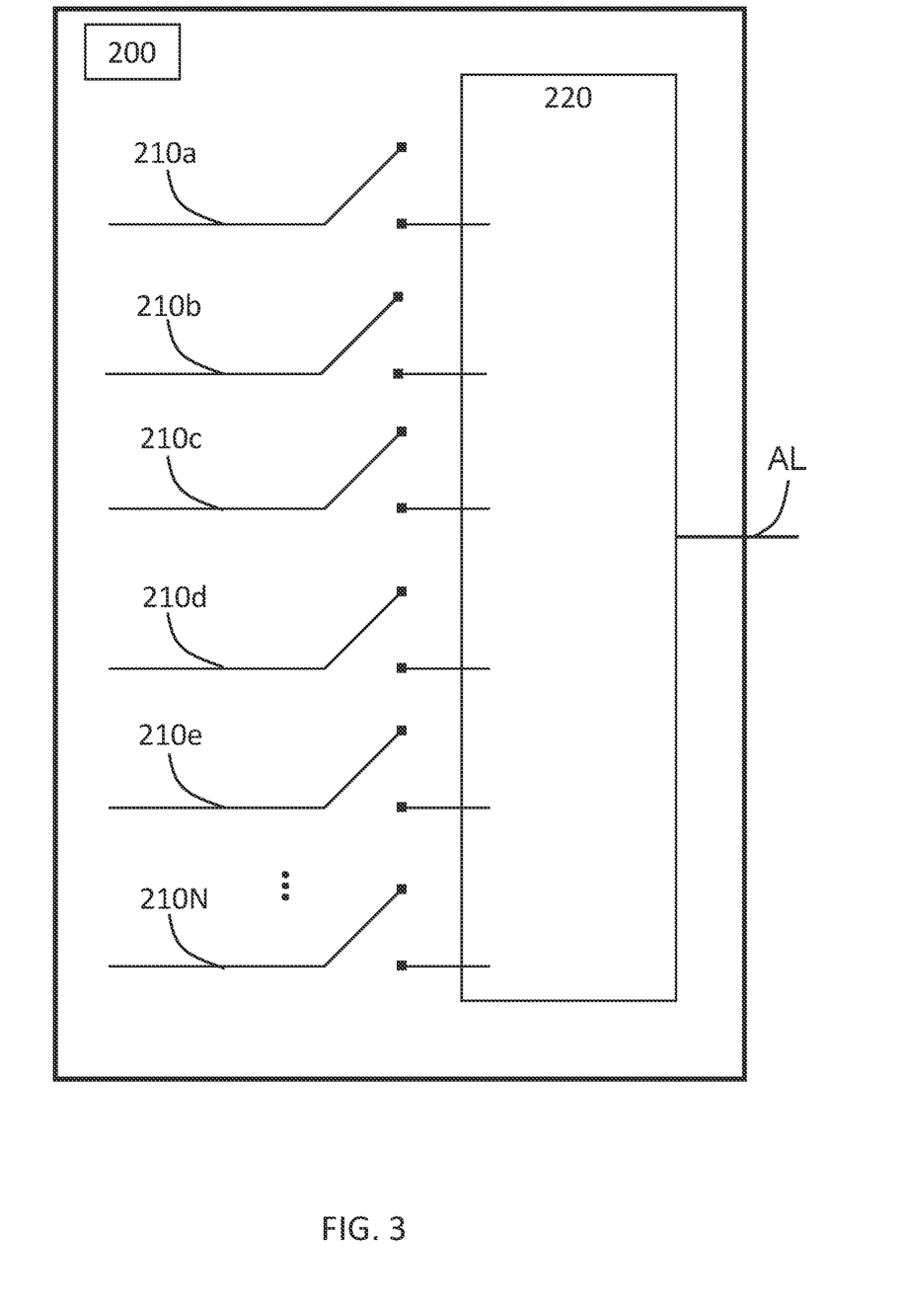

FIG. 3 shows an example of a safety fault management unit 200 which will be described in further details below.

A system control unit 300 can include hardware circuitry that generates and outputs a port emergency stop (PES) signal. As used herein, "hardware circuitry" can refer to electronic hardware components or non-software implemented circuitry.

Figure 4:
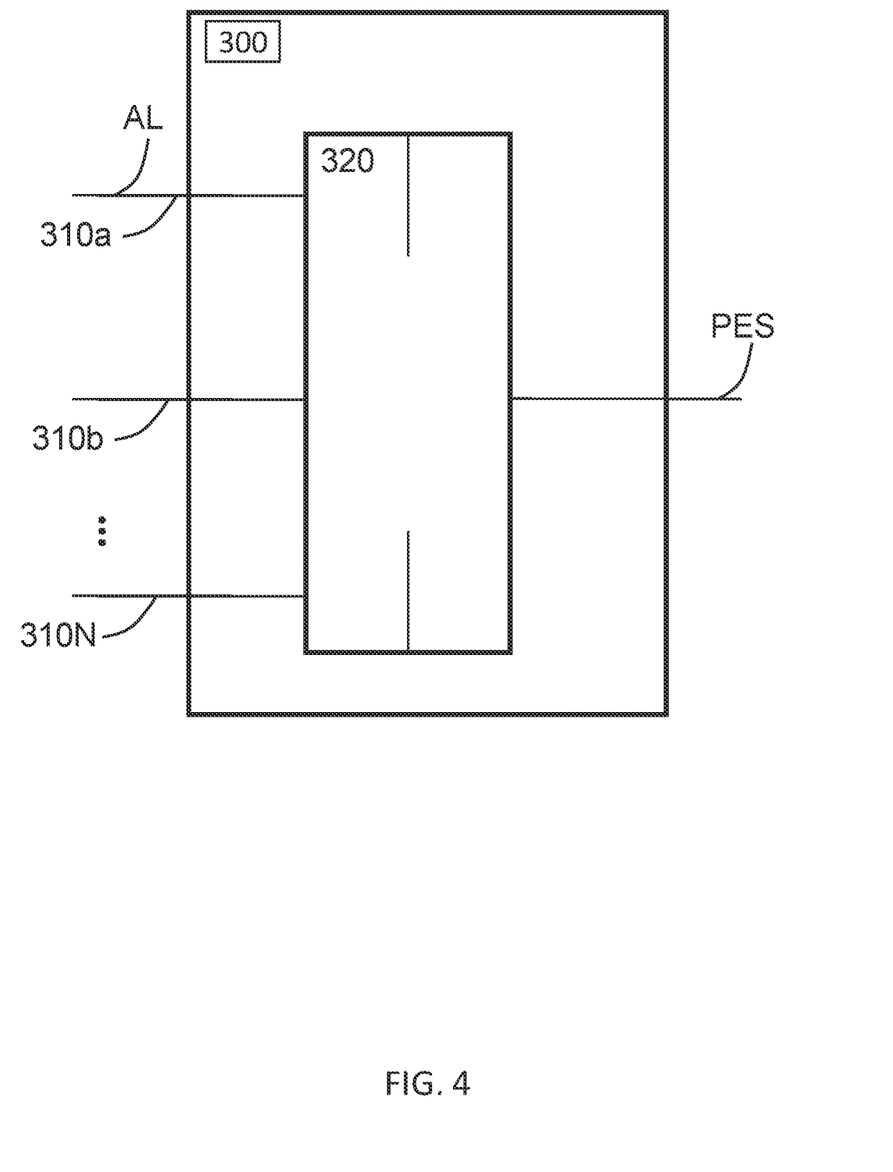

The system control unit 300 may output a PES signal based on the one or more alarm signals the system control unit 300 receives or obtains from at least one safety fault management unit 200. The system control units 300 can operate in parallel to the at least one core 100. An outputted PES signal can trigger the closure or non-operation of a port (e.g., input and/or output port) coupled to the system control unit 300. FIG. 4 shows an example of a system control unit 300 which will be described in further details below.

Figure 5:
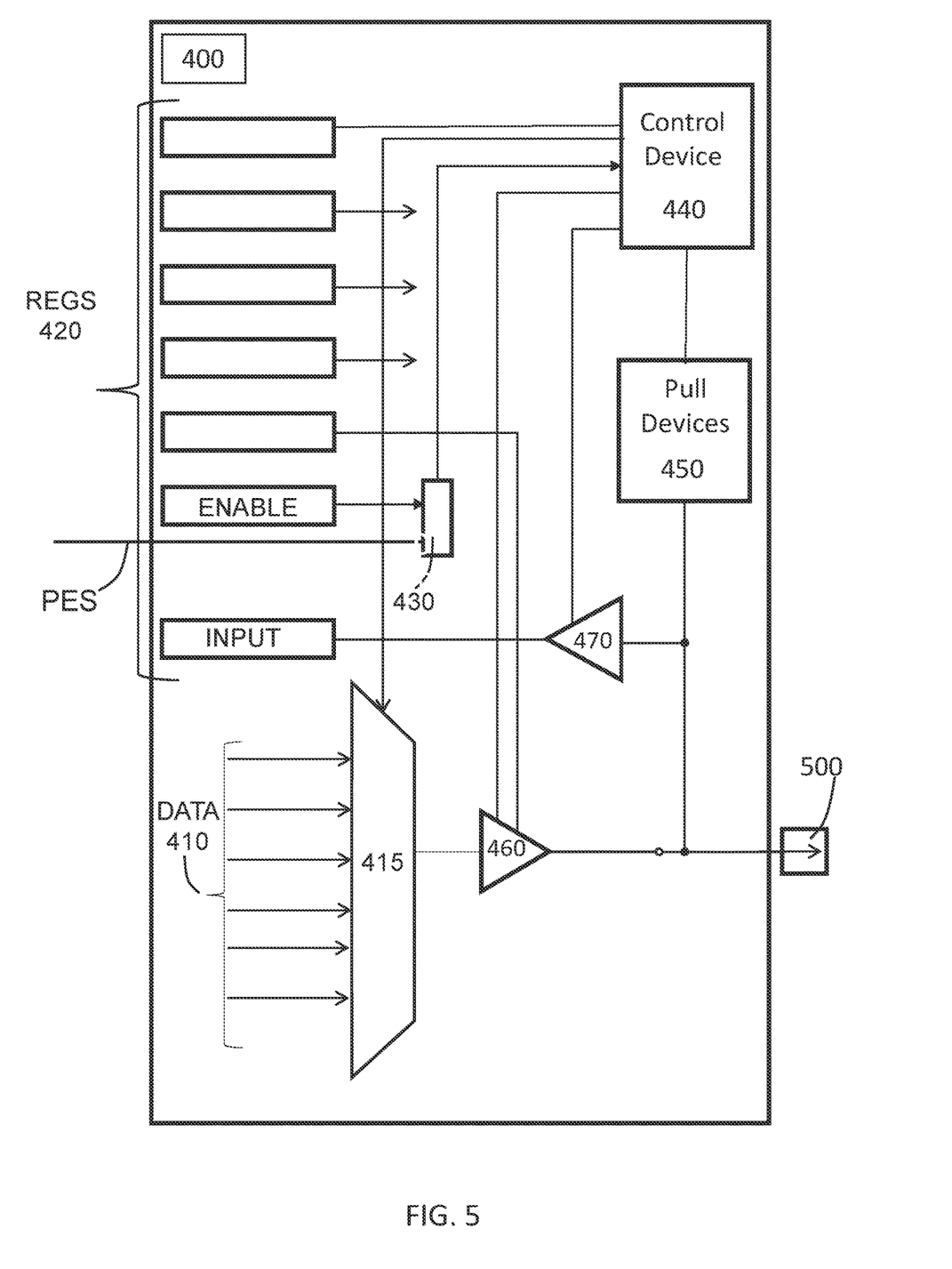

Each of the system control units 300 may be coupled to one respective port via a port circuitry 400. That is, the port circuitry 400 may be circuitry configured to selectively cause a respectively connected port to enter a non-operational electronic state in response to receiving a PES signal. FIG. 5 shows an example of a port circuitry 400 which will be described in further details below.

Figure 2A:
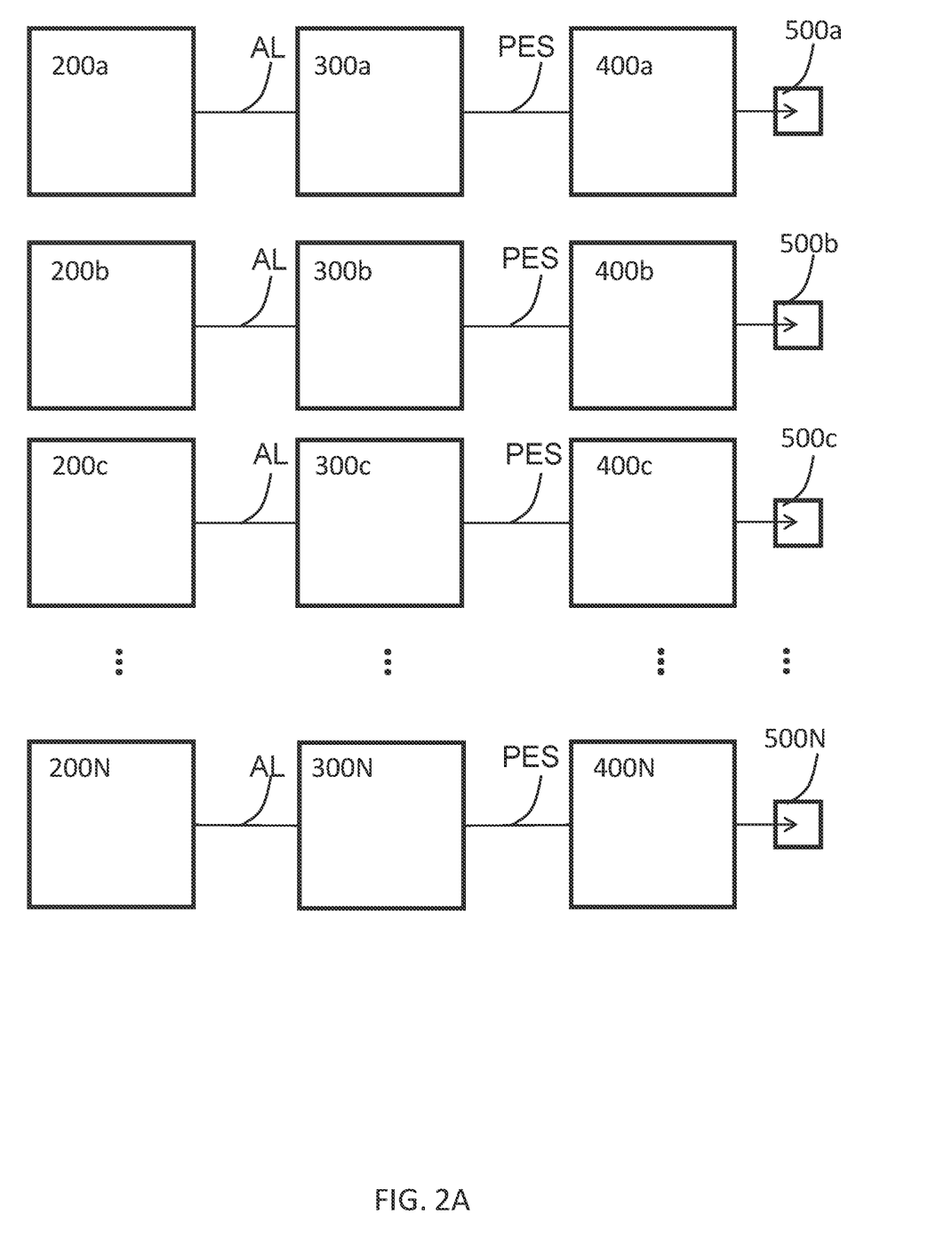
FIGS. 2-5 are diagrams of exemplary components of the microcontroller according to at least one exemplary embodiment of the present disclosure.

FIG. 2A shows one exemplary configuration of the microcontroller 10. In FIG. 2A, the microcontroller 10 includes a one-to-one configuration with respect to the safety fault management units 200, system control units 300, the port circuitries 400, and the ports/pins 500.

The microcontroller 10 in FIG. 2A includes a plurality of safety fault management units 200, individually labelled 200a-200N, where N represents an arbitrary number. Similarly, a plurality of system control units, labelled 300a-300N are included.

As shown, each of the plurality of safety fault management units 200 are respectively coupled to one of the plurality of system control units 300. For example, the safety fault management unit 200a is connected to the system control unit 300a, the safety fault management unit 200b is connected to the system control unit 300b, the safety fault management unit 200c is connected to the system control unit 300c, and so on. Each of the plurality of system control units 300 is also coupled to one of the plurality of port circuitries 400. For example, the system control unit 300a is connected to the port circuitry 400a, the system control unit 300b is connected to the port circuitry 400b, the system control unit 300c is connected to the port circuitry 400c, and so on. Further, of the plurality of port circuitries 400 is coupled to one of the pins 500. For example, the port circuitry 400a is connected to the port 500a, the port circuitry 400b is connected to the port 500b, the port circuitry 400c is connected to the port 500c, and so on.

In the example of FIG. 2A, each of the safety fault management units 200 can send an activation or alarm signal (AL signal) to the corresponding one of the system control units 300. As described, a safety fault management unit 200 may be configured to send an alarm signal AL upon detecting or discovering one or more particular faults or events have or are occurring in the microcontroller 10. Further, as shown, a system control unit 300 can generate and output a port emergency stop (PES signal) to the corresponding one of the port circuitries 400, based on receiving an AL signal.

A PES signal output by a system control unit 300 can trigger the corresponding port circuitry 400 to close or render non-functional the corresponding port 500 connected to the port circuitry 400. That is, the PES signal triggers an "emergency stop functionality" to be implemented by the port circuitry 400, which causes the corresponding connected port 500 to enter non-operational state. In doing so, the shutdown or port emergency stop takes priority and can override any other operations or actions currently running with respect to the port 500.

In other embodiments, there does not necessarily have to be a one-to-one configuration, in particular with respect to the safety fault management units 200 and the system control units 500. Further, there may not be an equal number of safety fault management units 200 and system control units 300.

Figure 2B:
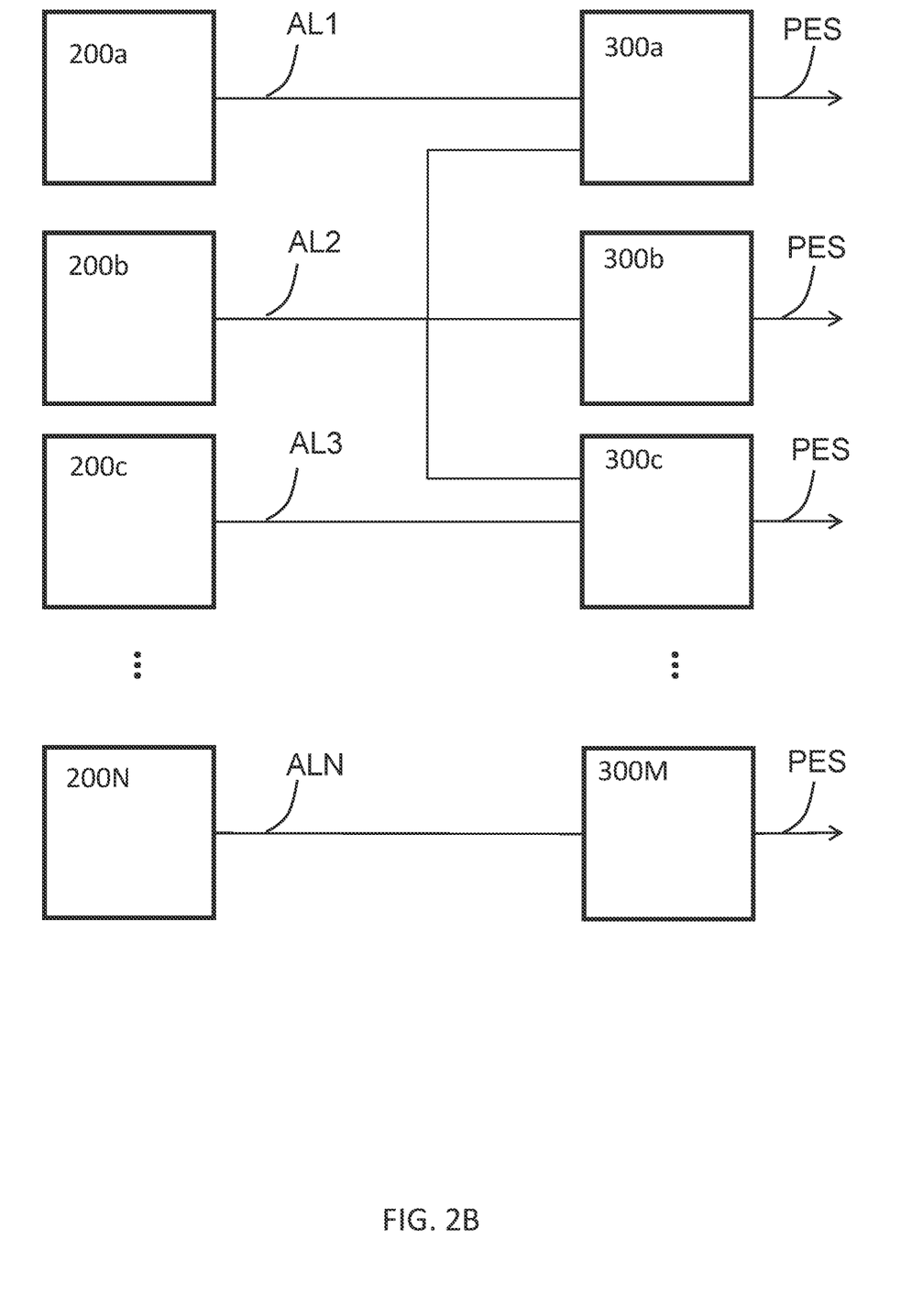

FIG. 2B shows another exemplary embodiment or aspect of the microcontroller 10. In FIG. 2B, a different configuration of the safety fault management units 200 and the system control units 300 is depicted. However, like in FIG. 2A, each of the system control units 300 (system control units 300a-300M) can be respectively connected to one corresponding port circuitry 400 which can also be connected to one corresponding port 500.

As shown in FIG. 2B, the number of safety fault management units 300 (N safety fault management units) and the number of system control units 400 (M safety control units) can differ. As such, the system control units 300 in FIG. 2B are not necessarily coupled to only one corresponding safety fault management unit 300. That is, in some embodiments, a system control unit 300 may be connected and can be configured to receive or obtain AL signals from one or more than one safety fault management unit 200.

In the example of FIG. 2B, the system control unit 300a can be configured to receive AL signals from the safety fault management unit 200a and the safety fault management unit 200b. The safety fault management unit 200b can output and provide the alarm signal AL2 to the system control units 300a, 300b, and 300c. The safety fault management unit 200a and the safety fault management unit 200c respectively can output and provide their alarm signals AL1 and AL3 to the system control unit 300a and 300c respectively. Of course other combinations can be realized. That is, other combinations of alarm signals, (e.g., including one, two, or more alarm signals AL, etc.) from one or more safety fault management units 200, may be received by one or more system control units 300.

Figure 2C:
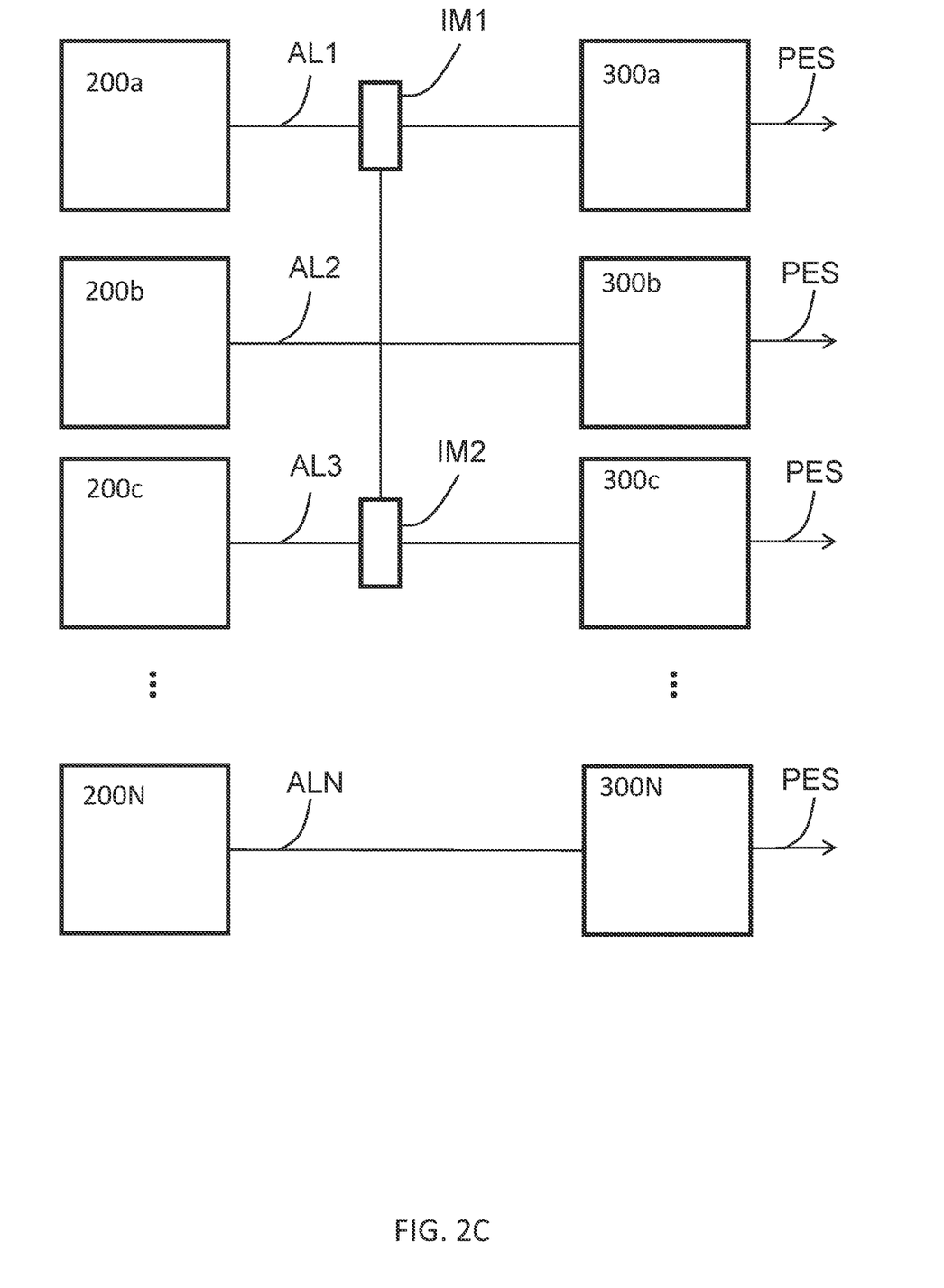

In other examples, one or more circuits may exist between the safety fault management units 200 and the system control units 300. For example, FIG. 2C shows another exemplary embodiment of the microcontroller 10. Specifically, the configuration of the safety fault management units 200 and the system control units 300 is depicted. Each of the system control units 300 (system control units 300a-300M) can be respectively connected to a corresponding port circuitry 400 which is also connected to a corresponding port 500.

Further in FIG. 2C, a system control unit 300 may obtain an alarm signal AL from one or more safety control units through an intermediary circuitry. The intermediary circuitry, may be, for example control logic circuitry.

For example, the intermediary circuitry IM1 may functionally operate as or similar to a logic "OR" and provide or forward a received AL signal to the system control unit 300a if it receives an alarm signal from either the safety fault management unit 200a or the safety fault management unit 200b. That is, the intermediary circuitry IM1 will provide or forward an alarm signal to the system control unit 300a if it receives one or both of the alarm signals AL1 and Al2 from the safety fault management unit 200a.

Also in FIG. 2C, the intermediary circuitry IM2 may operate as a logic "AND" and thus only forward an alarm signal to the system control unit 300c if it receives, e.g., at the same time, alarm signals AL2 and AL3 respectively from the safety fault management unit 200b and the safety fault management unit 200c.

The configurations depicted in FIGS. 2A-2C are merely exemplary as other combinations or permutations may be realized. That is, there may be some configurations that use any suitable combination of one-to-one configurations, some multiple inputs (e.g., one or more multiple alarm signals) to one or more of the system control units 300 implementations, and some intermediary circuitry implementations.

FIG. 3 shows an exemplary safety fault management unit 200 according to at least one embodiment of the present disclosure. A safety fault management unit 200 can receive one or more inputs. In FIG. 3, the safety fault management unit 200 can receive the input (e.g., data or signals) at the input or input lines 210a-210N, where N represents an arbitrary number.

The inputs 210 of a safety fault management unit 200 may be signals, e.g., safety or event related signals, from the one or more electronic components of the microcontroller 10. Each of the plurality of safety fault management units 210 can have a different set of inputs or receive a different set of input signals. That is, each safety fault management unit 210 can be configured differently to accept a different set of input (e.g., safety or event signals).

In one example one of the plurality of safety units 200 can receive as input, one or more signals from the one or more processor cores 100. Signals that may be provided to the safety units 200 include CPU reset signals, signals indicating voltage supply failures (e.g., indicating undervoltages or overvoltages of supply voltages), signals indicating clock failures (e.g., watchdog signals), signals indicating data integrity errors (e.g., error correcting code signals (ECC), error detection and correction (EDC) signals), signal indicating input and/or output errors (e.g., indicating unexpected frequencies, pin mismatches, etc.).

Each of the safety fault management units 200 can be configured to react or take one or more actions in response to signals received as input. The inputs or input lines 210a-210N may include a switch so that when a signal is present on the inputs 210a-210N, the signal is forwarded to the control circuitry 220.

The control circuitry 220 can be configured to output an alarm signal AL based on the inputs. In one example, the control circuitry may be or operate as a logic "OR". In such a case, the presence or reception of a signal to any of the inputs to the safety fault management unit 200 can cause an output of the alarm signal, AL. The control circuitry 220 may be implemented with other types of logic, including logic "AND" type circuitry may be implemented, which would require the presence of two or more signals to be present for the control logic circuitry to output the alarm signal AL. In yet other examples, the logic of the control logic circuitry 220 may be more complex, including any suitable combination of logic circuit units, e.g., AND, OR, etc. In general, the control circuitry 220 may be implemented in other suitable forms.

Further, the control circuitry 220 may be configurable, e.g., at least initially, and may in some instances also be reconfigurable. For example, the microcontroller 10 include interface circuitry to allow a user or another component (e.g., external or internal) to configure and/or reconfigure the control circuitry 220. For example, the control circuitry 220 may include configurable logic for causing the control circuitry 220 to output an alarm signal based on one or more specified or set inputs.

FIG. 4 shows a system control unit 300 according to at least one exemplary embodiment of the present disclosure. The system control unit 300 can be configured to output a PES signal based on reception of a safety alarm signal AL. The input 310a can represent one input line of a plurality of input lines that can receive an alarm signals. Further, in some embodiments, the system control unit 300 can also include further input or input lines to receive inputs or input signals other than alarm signals.

In the example of FIG. 4, the system control unit 300 also includes inputs 310 or input lines 310b-310N. These inputs 310 can be connected to one or more safety fault management units 200.

Further, at least one input or input line may be coupled or connected to other parts or electronic components of the microcontroller 10, e.g., other than the safety fault management units 200. In one example, one input 310 may be connected to some connected to an input port of the microcontroller 10 or may be connected to an input or input port of the microcontroller 10. In another example, one or more of the inputs 310b-310N may be connected to one or more of the cores 100.

As with the system control unit 300 may include circuitry, e.g., hardware circuitry 320. The hardware circuitry 320 may be configured to generate and output a port emergency stop (PES) signal, e.g., based on or response to certain input or input signals received by the system control unit 300. In particular, the hardware circuitry 320 may be configured to output a PES signal based on certain conditions existing in the microcontroller 10, which are reflected in the inputs provided to the system control unit 300.

In some cases, the one or more AL signals received by the system control unit 300 alone may not be sufficient to cause the hardware circuitry 320 to generate and output a PES signal. Other conditions, which are reflected in the inputs or signals input to system control unit 300, may be necessary for the hardware circuitry to generate and output a PES signal.

The system control unit 300 may be configurable. For example, configuration bits (e.g., set in registers or other suitable medium) may be configured or set (e.g., through an interface circuitry) to control and identify the particular AL signals can trigger a PES signal to be output by the system control 300.

The system control unit 300 can include a scanning circuit, which may be always or constantly active. The scanning circuit of the system control unit 300 can be configured to scan for all the AL signals which are configured to trigger a PES signal output by the system control unit 300. If an AL signal is generated to notify of an error, the scanning circuit identifies the AL signal and is further configured to save the status of the event in status bits, e.g., in registers or other medium in the system control unit 300.

Further, in response to detecting or finding the presence of an AL signal that triggers a PES signal output, the scanning circuit activates a PES generation circuit of the system control unit 300 to generate the PES signal to be output by the system control unit 300. In one instance, simple logic may be implemented or realized in PES generation circuit. For example, the state in the PES generation circuit, e.g., settable or changeable based on the input. A "0" indicating a Fault-free-state (e.g., not PES signal to generate) to a "1" on PES signal, indicating Fault-state). The state may change based on or in response to the input from the scanning circuit or another suitable entity.

Further, in some other exemplary embodiments of the present disclosure, safety fault units described herein may have other types of reaction generation circuits. In one example, for PES signal generation, a trigger interrupt (or non-maskable interrupts) may be realized or implemented to notify the software running or executing on the CPU that there is a fault in the microcontroller and safety fault units has triggered PES.

FIG. 5 shows a port circuitry 400 according to at least one exemplary embodiment of the present disclosure. The port circuitry 400 includes data lines 410 that may be coupled to data selector, 415, e.g., a multiplexer, which can be further coupled to an input circuitry or a buffer 460, that may be connected to the port 500.

The port circuitry 400 may include a plurality of registers 420. The registers 420 may be configured to control certain aspects of the port circuitry 400. At least one of the registers 420 may be an input register (INPUT) that can be configured to receive and store data input via the port 500 through at least the input control circuitry 470.

As shown, the port circuitry 400 can receive a PES signal, e.g., from a respective system control unit 300. The PES signal received by the port circuitry 400 can trigger a "shut down" a port 500. The PES signal line may be directly coupled to the control device circuitry 440, or in the example of FIG. 5, may be coupled to the control device circuitry 440 through an enable circuitry 430. In FIG. 5, a PES signal may only trigger the control device circuitry 440 to render the port 500 non-functional if the PES functionality of the port circuitry 400 is enabled. The PES function may be enabled using an "ENABLE" register that has a high or "1", value. This data value can be provided by the register so as to be "ANDED" with the PES data line using the enable circuitry 430. That is, when the ENABLE is properly set, e.g., a 1 or other suitable value, and when the PES signal is present on the PES signal line, the enable circuitry 430 can send a signal to activate the control device circuitry 440 in accordance with embodiments herein.

The control device circuitry 440 can be configured to control operations of certain aspects of the port circuitry 400. In the example of FIG. 5, when activated by a PES signal, the control device circuitry 440 can stop the port 500 from further functioning, e.g., as an input or output port. More specifically, the control device circuitry 440 in response to being triggered, can cause the port 500 to be brought into a predefined non-operational electronic state. In doing so, the control device circuitry 440 can immediately override any current or future operations or functioning of the port 500.

In one instance, the port circuitry 400 includes pull device circuitry 450. The pull device circuitry 450 can be a switchable pull-down or pull-up resistor or a tri-state logic device. The pull device circuitry 450, in response to being activated or triggered by the control device circuitry 440, can cause the port 500 to enter a non-functional electronic state, e.g., a low state (e.g., ground state) or pulled-up to a voltage or high state. That is, when activated the pull device circuitry 450 can ensure that the port 500 is no longer functioning or operational.

Further, in some examples, the PES signal may cause or trigger the control device circuitry 440 to shut down or render non-functioning other electronic components of the port circuitry, e.g., data selector 415, input buffer 470, output buffer 460, etc.

In one embodiment, after being activated by a PES signal to implement the emergency stop of the port 500, the control device circuitry 440 may cause the port 500 to remain in the non-functioning or non-operating state as long as the PES signal (and as long as the PES functionality is enabled). In other examples, the control device circuitry 440, may keep the port 500 in the emergency stop or non-functioning state for predefined or preset period of time.

Figure 6:
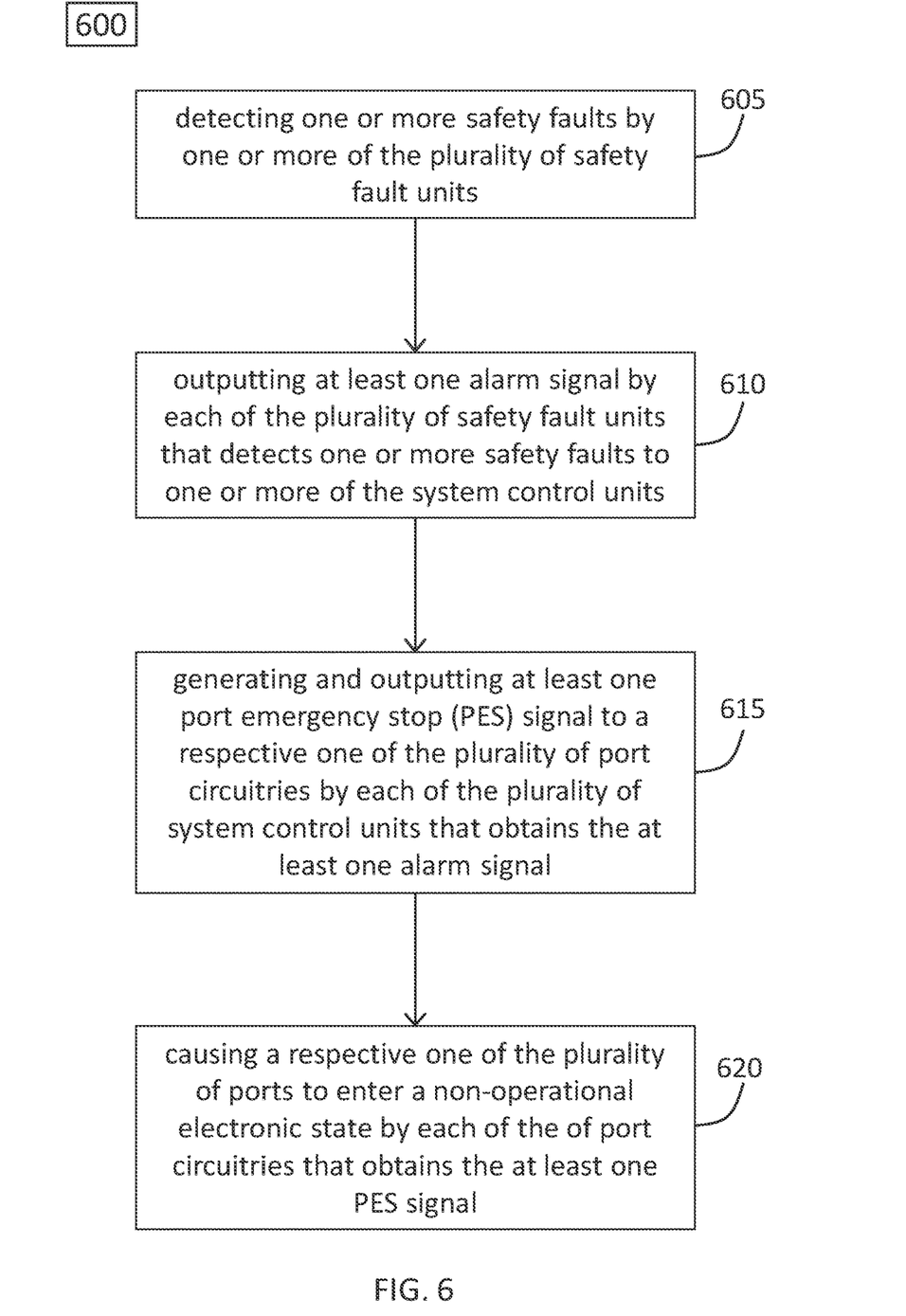
FIG. 6 shows a method according to at least one exemplary embodiment of the present disclosure.

FIG. 6 shows a method 600 according to at least one exemplary embodiment of the present disclosure. The method 600 may be implemented or performed by exemplary microcontrollers described herein. For example, it may be performed by the microcontroller 10 of FIG. 1, which can at least include at least one core, a plurality of safety fault units, a plurality of system control units, and a plurality of ports.

The method 600 includes at 605, detecting one or more safety faults by one or more of the plurality of safety fault units. Then at 610, the method 600 can include outputting at least one alarm signal by each of the plurality of safety fault units that detects one or more safety faults to one or more of the system control units. At 615, the method 600 includes generating and outputting at least one port emergency stop (PES) signal to a respective one of the plurality of port circuitries by each of the plurality of system control units that obtains the at least one alarm signal. Further, at 620, the method 600 includes causing a respective one of the plurality of ports to enter a non-operational electronic state by each of the of port circuitries that obtains the at least one PES signal.

Figure 7:
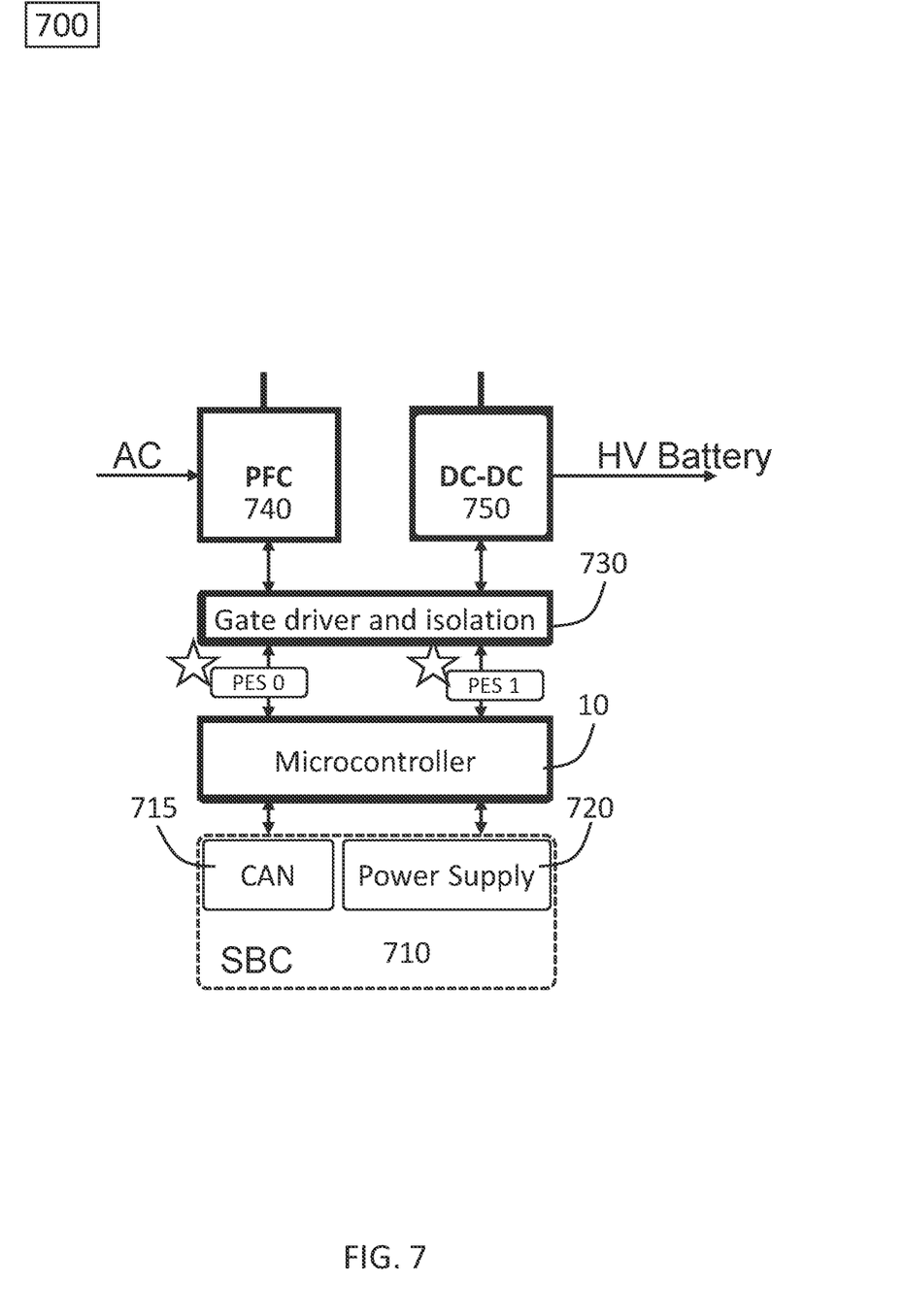
FIG. 7 shows a diagram of a system according to at least one exemplary embodiment of the present disclosure.

FIG. 7 shows a system 700 that can include the microcontroller 10 of FIG. 1. The system 700 may be a system implemented for high voltage system, e.g., for a vehicle. The system 700 may be an on-board charging (OBC) system. As shown, the system 700 can include a System Basis Chip (SBC) 710. In the example of FIG. 7, the SBC 710 may at least include a controller area network 715 and a power supply 720.

Further, the system 700 may include a microcontroller, which in this example can be the microcontroller 10 or another similar microcontroller as described in accordance of embodiments of the present disclosure. The microcontroller 10 may be coupled and communicate with the SBC 10 and with a gate driver isolation circuitry 730. That is, the microcontroller 10 may interface with components of the system 700 via the gate driver and isolation circuitry. In this example, the system 700 includes a power factor correction (PFC) converter 740 and a DC to DC converter 750. The PFC 740 can take the AC signal AC as input. Similarly, the DC-DC converter can take a DC input to produce another DC signal (high voltages) that is to be provided to a high voltage battery.

In some cases, the operation of the PFC 740 and the DC-DC converter 750 may be influenced or directed by the microcontroller 10. In certain cases, conditions may exist and are detected that requires the shutdown of the port or ports that interfacing with such components. In one example, the port or ports to only of the components, e.g., either the PFC 740 or the DC-DC converter 750, the microcontroller 10 can implement the PES functionality described herein so that only the needed port is shut down, by the hardware of the microcontroller. This leaves the other components free to function or interface with the microcontroller 10 freely without interruption.

The following examples pertain to further aspects of this disclosure:

Example 1 is a microcontroller unit including: at least one core; a plurality of safety fault management units, each safety fault management unit comprising circuitry configured to detect one or more safety faults and further configured to output an alarm signal in response to detection of one or more safety faults; a plurality of system control units operating in parallel to the at least one core, wherein each of the plurality of system control units is coupled to at least one of the plurality of safety fault management units and comprises hardware circuitry configured to generate and output a port emergency stop (PES) signal based on the one or more alarm signals obtained from the at least one safety fault management unit; a plurality of ports; and a plurality of port circuitries respectively coupled to the plurality of ports and to the plurality of system control units, each of the plurality of port circuitries configured to selectively cause the respectively connected port to enter a non-operational electronic state in response to receiving a PES signal.

Example 2 is the subject matter of Example 1, wherein the hardware circuitry of each of the plurality of the system control units can be further configured to obtain one or more additional input signals.

Example 3 is the subject matter of Example 2, wherein the hardware circuitry of each of the system control units can further include control logic circuitry to selectively generate and output the port emergency stop (PES) signal based on the one or more additional input signals and the respective safety fault signal.

Example 4 is the subject matter of any of Examples 1 to 3, wherein each of the safety fault management units can be configured to independently detect one or more safety faults.

Example 5 is the subject matter of any of Examples 1 to 4, wherein each of the plurality of the safety fault management units can be configured to detect a unique combination of one or more safety faults.

Example 6 is the subject matter of any of Examples 1 to 5, wherein each of the system control units can operate independently from each other.

Example 7 is the subject matter of any of Examples 1 to 6, wherein each of the plurality of ports respectively connected to the system control units can be an input and/or output port.

Example 8 is the subject matter of any of Examples 1 to 7, wherein each of the plurality of port circuitries can be configured to cause the respective port to enter a non-operational electronic state comprises to cause the port to be connected to a pull-down resistor, a pull-up resistor, or a tri-state logic device.

Example 9 is the subject matter of any of Examples 1 to 8, wherein each of the plurality of port circuitries can be configured to selectively cause the respectively connected port to enter the non-functional electronic state is further configured to cause the respectively connected port that has entered the non-functional electronic state to remain in the non-functional electronic state as along as the PES signal is being received.

Example 10 is the subject matter of any of Examples 1 to 9, wherein each of the plurality of port circuitries configured to selectively cause the respectively connected port to enter the non-functional electronic state is further configured to cause the respectively connected port that has entered the non-functional electronic state to remain in the non-functional electronic state for at least predefined period of time.

Example 11 is the subject matter of any of Examples 1 to 10, wherein each of the plurality of port circuitries configured to selectively cause the respectively connected port to enter the non-functional electronic state is further configured to cause the respectively connected port that has entered the non-functional electronic state to exit from the non-functional electronic state in response to receiving a release signal.

Example 1A is method to be implemented by a microcontroller comprising at least one core, a plurality of safety fault management units, a plurality of system control units, and a plurality of ports, the method including: detecting one or more safety faults by one or more of the plurality of safety fault management units; outputting at least one alarm signal to one or more of the system control units by each of the plurality of safety fault management units that detects one or more safety faults; generating and outputting at least one port emergency stop (PES) signal to a respective one of the plurality of port circuitries by each of the plurality of system control units that obtains the at least one alarm signal; and causing a respective one of the plurality of ports to enter a non-operational electronic state by each of the of port circuitries that obtains the at least one PES signal.

Example 2A is the subject matter of Example 1A, wherein each of the plurality of system control units can operate in parallel to the at least one core.

Example 3A is the subject matter of Example 1A or 2A, wherein each of the plurality of system control units can be coupled to one or more of the plurality of safety fault management units.

Example 4A is the subject matter of any of Examples 1A to 3A, wherein each of the plurality of system control units can include hardware circuitry configured to generate and output a port emergency stop (PES) signal.

Example 5A is the subject matter of Example 4A, wherein the hardware circuitry of each of the plurality of the system control units can be further configured to obtain one or more additional input signals.

Example 6A is the subject matter of Example 5A, wherein the hardware circuitry can further include control logic circuitry, and wherein generating and outputting the at least one PES signal by each of the plurality of system control units that obtains the at least one alarm signal can include generating and outputting the PES signal by the control logic circuitry based on the one or more additional input signals and the at least one safety fault signal.

Example 7A is the subject matter of any of Examples 1A to 6A, wherein each of the safety fault management units can be configured to independently detect one or more safety faults.

Example 8A is the subject matter of any of Examples 1A to 7A, wherein each of the plurality of the safety fault management units can be configured to detect a unique combination of one or more safety faults.

Example 9A is the subject matter of any of Examples 1A to 8A, wherein the system control units operate independently from one another.

Example 10A is the subject matter of any of Examples 1A to 9A, wherein each of the plurality of ports connected to the system control units can be an input and/or output port.

Example 11A is the subject matter of any of Examples 1A to 10A, wherein each of the port circuitries can be respectively coupled to one of the plurality of ports and to one the plurality of system control units.

Example 12A is the subject matter of Example 11A, wherein each of the plurality of port circuitries can be configured to cause the respective port to enter a non-operational electronic state comprises to cause the port to be connected to a pull-down resistor or a pull-up resistor.

Example 13A is the subject matter of any of Examples 1A to 12A, wherein causing the respective one of the plurality of ports to enter the non-operational electronic state further can further include causing the one of the plurality of ports to remain in the non-functional electronic state as along as the at least one PES signal is being obtained by the respective port circuitry.

Example 14A is the subject matter of any of Examples 1 A to 13A, wherein causing the respective one of the plurality of ports to enter the non-operational electronic state can further include causing the one of the plurality of ports to remain in the non-functional electronic state for at least predefined period of time.

Example 15A is the subject matter of any of Examples 1A to 14A, wherein causing the respective one of the plurality of ports to enter the non-operational electronic state can further include causing the one of the plurality of ports to exit from the non-functional electronic state in response to receiving a release signal.

It should be noted that one or more of the features of any of the examples above may be suitably or appropriately combined with any one of the other examples or with embodiments disclosed herein.

The foregoing description has been given by way of example only and it will be appreciated by those skilled in the art that modifications may be made without departing from the broader spirit or scope of the invention as set forth in the claims. The specification and drawings are therefore to be regarded in an illustrative sense rather than a restrictive sense.

The scope of the disclosure is thus indicated by the appended claims and all changes which come within the meaning and range of equivalency of the claims are therefore intended to be embraced.

It is appreciated that implementations of methods detailed herein are demonstrative in nature, and are thus understood as capable of being implemented in a corresponding device. Likewise, it is appreciated that implementations of devices detailed herein are understood as capable of being implemented as a corresponding method. It is thus understood that a device corresponding to a method detailed herein may include one or more components configured to perform each aspect of the related method.

All acronyms defined in the above description additionally hold in all claims included herein.

What is claimed is:

1. A microcontroller unit comprising:
    at least one core;
    a plurality of safety fault management units, each safety fault management unit comprising circuitry configured to detect one or more safety faults and further configured to output an alarm signal in response to detection of one or more safety faults;
    a plurality of system control units operating in parallel to the at least one core, wherein each of the plurality of system control units is coupled to at least one of the plurality of safety fault management units and comprises hardware circuitry configured to generate and output a port emergency stop (PES) signal based on the one or more alarm signals obtained from the at least one safety fault management unit;
    a plurality of ports; and
    a plurality of port circuitries respectively coupled to the plurality of ports and to the plurality of system control units, each of the plurality of port circuitries configured to selectively cause the respectively connected port to enter a non-operational electronic state in response to receiving a PES signal.

2. The microcontroller unit of claim 1, wherein the hardware circuitry of each of the plurality of the system control units is further configured to obtain one or more additional input signals.

3. The microcontroller unit of claim 2, wherein the hardware circuitry of each of the system control units further comprises control logic circuitry to selectively generate and output the port emergency stop (PES) signal based on the one or more additional input signals and the respective safety fault signal.

4. The microcontroller unit of claim 1, wherein each of the safety fault management units is configured to independently detect one or more safety faults.

5. The microcontroller unit of claim 1, wherein each of the plurality of the safety fault management units is configured to detect a unique combination of one or more safety faults.

6. The microcontroller unit of claim 1, wherein each of the system control units operates independently from each other.

7. The microcontroller unit of claim 1, wherein each of the plurality of ports respectively connected to the system control units is an input and/or output port.

8. The microcontroller unit of claim 1,
    wherein each of the plurality of port circuitries is configured to cause the respective port to enter a non-operational electronic state comprises to cause the port to be connected to a pull-down resistor, a pull-up resistor, or a tri-state logic device.

9. The microcontroller unit of claim 1,
    wherein each of the plurality of port circuitries configured to selectively cause the respectively connected port to enter the non-functional electronic state is further configured to cause the respectively connected port that has entered the non-functional electronic state to remain in the non-functional electronic state as long as the PES signal is being received.

10. The microcontroller unit of claim 1,
    wherein each of the plurality of port circuitries configured to selectively cause the respectively connected port to enter the non-functional electronic state is further configured to cause the respectively connected port that has entered the non-functional electronic state to remain in the non-functional electronic state for at least predefined period of time.

11. The microcontroller unit of claim 1,
    wherein each of the plurality of port circuitries configured to selectively cause the respectively connected port to enter the non-functional electronic state is further configured to cause the respectively connected port that has entered the non-functional electronic state to exit from the non-functional electronic state in response to receiving a release signal.

12. A method to be implemented by a microcontroller comprising at least one core, a plurality of safety fault management units, a plurality of system control units, and a plurality of ports, the method comprising:

detecting one or more safety faults by one or more of the plurality of safety fault management units;

outputting at least one alarm signal to one or more of the system control units by each of the plurality of safety fault management units that detects one or more safety faults;

generating and outputting at least one port emergency stop (PES) signal to a respective one of the plurality of port circuitries by each of the plurality of system control units that obtains the at least one alarm signal; and     causing a respective one of the plurality of ports to enter a non-operational electronic state by each of the of port circuitries that obtains the at least one PES signal.

13. The method of claim 12, wherein each of the plurality of system control units operates in parallel to the at least one core.

14. The method of claim 12, wherein each of the plurality of system control units is coupled to one or more of the plurality of safety fault management units.

15. The method of claim 14, wherein each of the plurality of system control units comprises hardware circuitry configured to generate and output a port emergency stop (PES) signal.

16. The method of claim 15, wherein the hardware circuitry of each of the plurality of the system control units is further configured to obtain one or more additional input signals.

17. The method of claim 16, wherein the hardware circuitry further comprises control logic circuitry, and wherein generating and outputting the at least one PES signal by each of the plurality of system control units that obtains the at least one alarm signal comprises generating and outputting the PES signal by the control logic circuitry based on the one or more additional input signals and the at least one safety fault signal.

18. The method of claim 12, wherein each of the safety fault management units is configured to independently detect one or more safety faults.

19. The method of claim 12, wherein each of the plurality of the safety fault management units is configured to detect a unique combination of one or more safety faults.

20. The method of claim 12, wherein the system control units operate independently from one another.

* * * * *